J. C. PEARSON.
SPRING HUB FOR VEHICLE WHEELS.
APPLICATION FILED JAN. 29, 1912.

1,051,628.

Patented Jan. 28, 1913.

Witnesses
Nevelle Lyles
F. G. Campbell

Inventor
John C. Pearson
By Samuel H. Mick
Attorney

UNITED STATES PATENT OFFICE.

JOHN C. PEARSON, OF NATCHITOCHES, LOUISIANA.

SPRING-HUB FOR VEHICLE-WHEELS.

1,051,628.   Specification of Letters Patent.   Patented Jan. 28, 1913.

Application filed January 29, 1912. Serial No. 674,142.

*To all whom it may concern:*

Be it known that I, JOHN C. PEARSON, a citizen of the United States of America, residing at Natchitoches, in the parish of Natchitoches and State of Louisiana, have invented certain new and useful Improvements in Spring-Hubs for Vehicle-Wheels, of which the following is a specification.

This invention relates to spring hubs for vehicle wheels, the object of the invention being to provide an improved device of this character adapted to cushion the running gear of the vehicle with relation to the body thereof, while at the same time presenting a nonpuncturable surface to the road bed. This permits the elimination of the pneumatic tire with its many objectionable features.

It is a further object of the invention to provide means for taking up wear between the moving portions of the hub and for preventing the entrance of dust, dirt and mud to the interior or spring containing portion of the hub.

Further objects and advantages of the invention will be set forth in the detailed description which now follows.

Figure 1:
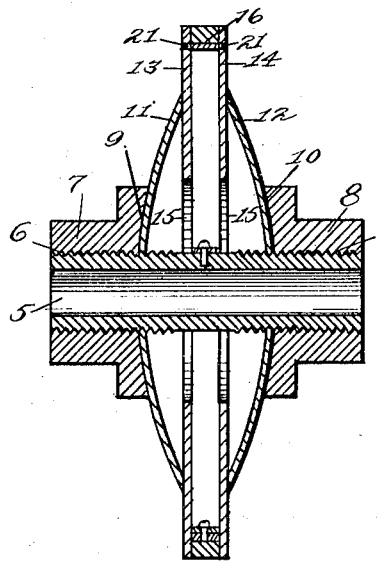
Figure 2:
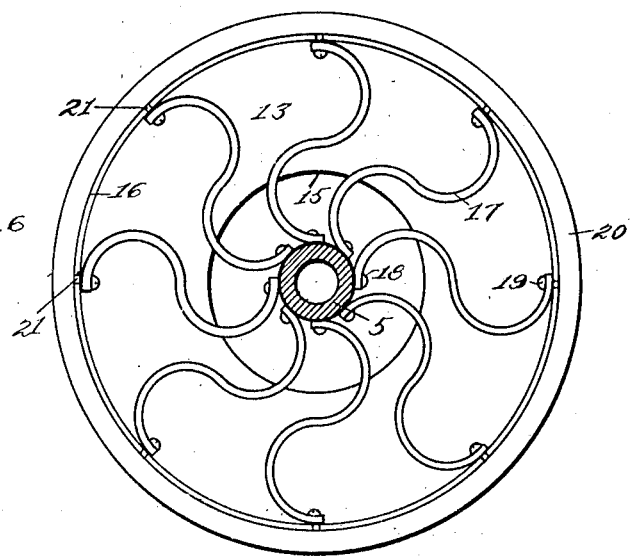
Figure 3:
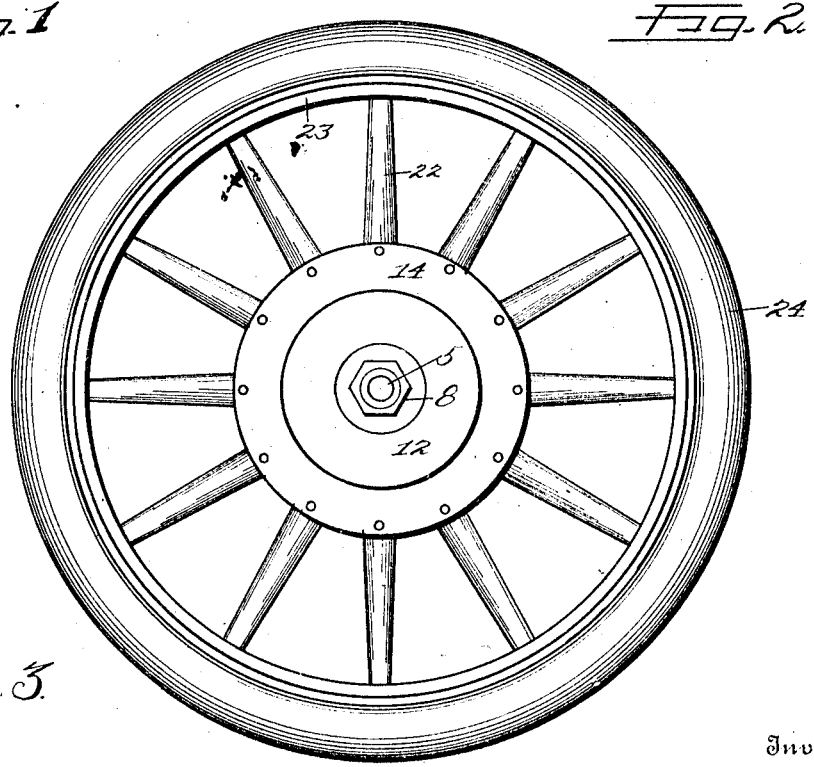

In the accompanying drawing Figure 1 is a vertical sectional view of a hub constructed in accordance with the invention. Fig. 2 is a view partly in section and partly in side elevation, with certain of the disks removed, and Fig. 3 is a side elevation of a complete wheel in which this hub is embodied.

Like numerals designate corresponding parts in all of the figures of the drawing.

Referring to the drawing, the numeral 5 designates an axle receiving sleeve, which is externally threaded at each end at 6 for the reception of nuts 7 and 8. These nuts have concave inner end faces 9 and 10, adapted to bear against concavo-convex disks 11 and 12. These disks, which will be hereinafter referred to as dished disks, have their outer edges bearing against circular plates 13 and 14. These plates 13 and 14 have openings 15 formed therein to permit of a certain amount of vertical play between the sleeve 5 and said plates. Extending between the sleeve 5 and a rim 16, are substantially S shaped spring spokes 17. While these spokes have been shown of S shape, it is apparent that they may be of other shapes and serve the same purpose, as long as they are spring spokes and extend between sleeve 5 and rim 16. The inner ends of these spokes are secured by screws or other fastening devices 18, to the sleeve 5, and by fastening devices 19 to the rim 16. The rim is encircled by a spoke receiving ring 20. The rim 16 carries driving lugs 21, which project transversely from its sides, and are counter-sunk into plates 13 and 14, as is best illustrated at the upper portion of Fig. 1. Rigid spokes 22 extend radially from ring 20 and carry an outer rim or felly 23, which may, if desired, be provided with a solid rubber tire 24 though the latter is not essential.

It is apparent that in operation, the spring spokes 17 cushion the axle with relation to felly 23. The openings 15 in plates 13 and 14 permit the necessary vertical movement to achieve this end. At this time, the outer edges of the dished disks 11 and 12 travel over the outer faces of plates 13 and 14. These dished disks provide means for taking up all wear between the parts, and they also provide means for resisting the great lateral thrust, which is brought upon wheels of this character when the vehicles upon which they are mounted tend to skid in turning curves at high rates of speed. Furthermore, these dished disks completely cover the opening 15 and effectively prevent the entrance of dust, dirt and mud to the spring chamber formed between said disks.

While the elements shown and described are well adapted to serve the purposes for which they are intended, it is to be understood that the invention is not limited to the precise construction set forth, but includes within its purview such changes as may be made within the scope of the appended claim.

Having described my invention, what I claim is:—

In a device of the character described, the combination with a horizontally disposed axle receiving sleeve, having its opposite ends externally threaded, of compression nuts threaded upon said sleeve, said compression nuts having concaved inner end faces, a pair of opposed dished disks fitting upon said sleeve and against which the concaved inner end faces of said nuts bear, a pair of plates having openings formed therethrough for the passage of said sleeve, said openings being of greater diameter than said sleeve, the peripheries of said dished disks bearing against said plates, a rim mounted between said plates at the outer portions thereof, and spring spokes yieldable vertically, but transversely rigid extending between said rim and the sleeve, and being secured to said rim and sleeve at their opposite ends, the inner faces of said plates bearing and pressing directly against the edges of said spokes.

In testimony whereof I affix my signature in presence of two witnesses.

JOHN C. PEARSON.

Witnesses:
LENN G. HENRY,
L. A. DELOUCHE.

Copies of this patent may be obtained for five cents each, by addressing the "Commissioner of Patents, Washington, D. C."